United States Patent Office 2,926,492
Patented Mar. 1, 1960

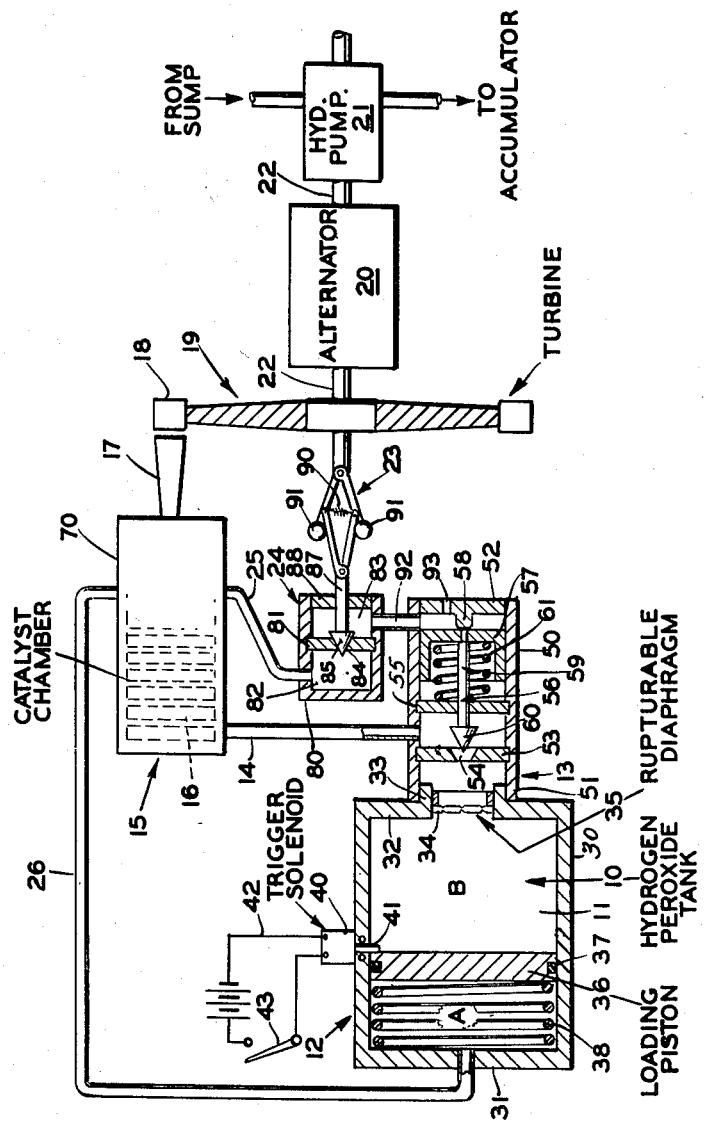

2,926,492

SELF CONTAINED POWER PLANT USING LIQUID DECOMPOSED INTO GASEOUS PRODUCTS

Robert M. Flanagan, Morris Plains, N.J., assignor to Bendix Aviation Corporation, Teterboro, N.J., a corporation of Delaware Application January 17, 1951, Serial No. 206,466

3 Claims. (Cl. 60—37)

This invention relates generally to power plants and more specifically has to do with self-contained power plants utilizing hydrogen peroxide as a fuel.

While the instant invention has general utility in that it may readily be adapted for use wherever a power supply is required, it has particular utility when used to provide power supply to operate the accessories of vehicles or apparatus such as rockets, missiles, torpedoes and the like.

Among other objects the present invention provides a novel, compact power plant wherein steam generated by the rapid decomposition of a hydrogen peroxide fuel is utilized to drive a single stage turbine to the end that an alternator and hydraulic pump mounted on the shaft of the turbine generate a source of electrical energy and a source of hydraulic power.

The instant invention also contemplates a novel fuel feeding mechanism for the system, and novel means for starting the flow of fuel through the fuel system of the power plant.

Another object of the present invention is to provide a novel means for supplementing the fuel feeding mechanism of the power plant during the operation thereof.

It is also an object contemplated herein to provide a novel means for metering the fuel supplied to the system to the end that a substantially constant rotation of the turbine is achieved, and therefore, substantially constant sources of electrical energy and hydraulic power are made available.

The foregoing and other objects and advantages will appear more fully hereinafter from a consideration of the detailed description which follows taken together with the accompanying drawing wherein one embodiment of the invention is illustrated by way of example. It is to be expressly understood, however, that the drawing is for the purpose of illustration only and is not to be construed as defining the limits of the invention.

The power plant contemplated herein comprises in general a fuel cell or tank 10 adapted to contain a fuel 11 such as hydrogen peroxide. A fuel feeding mechanism, generally indicated by the reference character 12 initiates the flow of fuel from the tank 10 into and through a metering valve 13, a conduit 14 and into a catalyst chamber 15. The fuel 11 is passed over and through catalyst screens 16 contained within the chamber 15, where the fuel 11 rapidly decomposes to the end that high pressure steam is generated within the chamber 15. A nozzle 17 directs a high velocity jet of the steam thus generated against the buckets 18 of a turbine 19. The turbine 19, an alternator 20 and a hydraulic pump 21 are mounted on a common shaft 22 so that the rotation of the turbine 19 also serves to operate the alternator 20 and pump 21. In order to control the rotational velocity of the shaft 22, and hence the output of the alternator 20 and pump 21, a fly-ball governor 23 is operatively positioned between the shaft 22 and a pilot valve 24. By means of a conduit 25, the pilot valve 24 is placed in communication with the chamber 15 to the end that steam generated within the chamber 15 may be utilized to control the metering valve 13 and thereby control the amount of fuel 11 delivered to the catalyst chamber 15. The power plant also includes a pressure conduit 26 which places the chamber 15 in communication with a portion of the fuel cell 10 in order to provide means whereby the action of the fuel feeding mechanism 12 on the fuel 11 may be supplemented during the operation of the power plant.

Referring more specifically to the drawing, the fuel cell or tank 10 comprises a cylindrical container 30 having end walls 31 and 32. The end wall 32 is provided with a neck 33 adapted to receive a closure or diaphragm 34 having a frangible center portion 35.

A free floating piston 36, slidably mounted within the cylinder 30, is provided with a suitable annular seal 37 and serves to divide the interior of the cylinder 30 into a pressure compartment A and a fuel compartment B. A compression spring 38, operatively positioned between the end wall 31 and the piston 36, urges the piston in the direction of the end wall 32, and is constructed and arranged as to move the piston 36 until it abuts the end wall 32, thereby assuring complete emptying of the fuel 11 from the tank 10.

A solenoid 40 is mounted externally of the container 30 and the plunger or trigger 41 thereof is adapted to reciprocate through an opening formed in the wall of the cylinder 30. The plunger 41 is spring loaded in a direction so as to normally extend into the interior of the cylinder 30, and thus forms a removable stop means or trigger whereby the piston 36 may be held in a fixed position within the cylinder 30 and the spring 38 may be held fully compressed. The solenoid 40 is connected into an electrical circuit 42 controlled by a switch 43. Upon energization of the solenoid 40 the trigger 41 is withdrawn permitting the piston 36 to be forced toward the end wall 32 under the biasing force of the spring 38.

The metering valve 13 mounted at the end wall 32 comprises a cylindrical casing 50 having an open end 51 that is adapted to be mounted on the neck 33 of the container 30, and an end wall 52 closing the opposite end thereof. A plate 53 having a centrally disposed orifice 54 is mounted within the casing 50 adjacent the end 51 thereof, and a second plate 55 is mounted medially of the length of the casing 50. Intermediate the plates 54 and 55 the wall of the casing 50 is provided with an opening for receiving one end of the conduit 14.

To control the effective area of the orifice 54 and thereby control the amount of fuel passing into the conduit 14, the metering valve 13 is further provided with a slidable member 56. This valve member 56 consists of a piston 57 adapted for sliding movement within the casing 50 between the plate 55 and a stop 58 carried by the end wall 52, a stem 59 that operates in a central opening in the plate 55, and a conically formed head portion 60 that serves to adjust the effective area of the orifice 54. A compression spring 61 operating between the plate 55 and the piston 57 biases the valve member 56 in the direction of the stop 58 to the end that conical head 60 is urged out of engagement with the coacting orifice 54.

The catalyst chamber 15 may be of any form, but is shown herein in the form of a cylindrical housing 70 in which is mounted the catalyst screens 16. The catalyst screens 16 may be of any suitable catalytic material such as silver, manganese, or copper, the only requirement being that the screens provide for the rapid decomposition of the hydrogen peroxide to effect the generation of high pressure steam within the chamber 15.

The conduit 14 enters the chamber 15 at one end thereof and the hydrogen peroxide fuel 11 is passed over and through the screen 16. The decomposition of the hydrogen peroxide fuel 11 generates a high pressure steam within the chamber 15 that is directed through a suitable nozzle 17 to impinge upon the buckets 18 of the turbine 19.

The turbine 19, alternator 20 and hydraulic pump 21 are mounted on a common shaft 22 so that when the turbine 19 is rotated by the high velocity jet of steam, the alternator 20 and pump 21 operate to produce a supply of electrical energy and hydraulic power.

It is desirable to maintain a substantially constant frequency output from the alternator 20 and hydraulic power from the pump 21. Therefore, since the frequency output of the alternator 20 and power of the pump 21 are directly related to the rotational velocity of the turbine 19, it is apparent that by controlling the rotation of the turbine 19 it is possible to establish a control over the alternator 20 and pump 21.

The velocity of the jet of steam issuing from the nozzle 17 is determined by the quantity or amount of hydrogen peroxide fuel 11 being decomposed in the catalyst chamber 15 and the rotational velocity of the turbine 19 is, in turn, determined by the velocity of the steam jet. Therefore, by controlling the quantity of fuel 11 delivered to the chamber 15 it is possible to control the rotation of the turbine 19. To that end, a fly-ball governor 23 carried by the shaft 22 is operatively associated with the pilot valve 24 of the metering valve 13. Thus, since the pilot valve 24 is adapted to control the metering valve 13, the quantity of fuel 11 delivered to the chamber 15 is brought under control.

The pilot valve 24 comprises a casing 80 having an internal wall 81 that divides the casing 80 into an inlet chamber 82 and an outlet chamber 83. The wall 81 is pierced to provide an orifice 84 and a valve member 85 cooperates with the orifice 84 to adjust the effective area thereof. The valve member 85 is carried by a steam 87 that reciprocates through a wall 88 of the casing 80 and is pivotally connected at one end thereof to the governor 23.

A spring 90 of the governor normally draws fly-ball weights 91 thereof together and the valve member 85 is thereby normally urged into sealing and closing contact with the orifice 84.

The inlet chamber 82 of the pilot valve 24 is placed in communication with the interior of the catalyst chamber 15 by a conduit 25, while the outlet chamber 83 thereof communicates through a conduit 92 with one end of the casing 50 behind the piston 57. Thus, means are provided whereby the steam generated in the chamber 15 may be brought into the metering valve 13 to move the valve member 56 against the bias of the spring 61. Any undesired leakage of steam past the valve member 85 is accommodated by a leak port 93 formed in the end wall 52 of the metering valve 13.

In the embodiment of the instant invention illustrated in the drawing, the parts thereof are shown in their relative positions when the power pack is not operating. Thus, the fuel compartment B contains a supply of fuel 11, while the piston 36 is restrained against movement by the stop 41 and the spring 38 fully compressed. The orifice 54 is open, and the turbine 19, alternator 20, pump 21 are stationary while the orifice 84 is fully closed.

To operate the power plant, the switch 43 is closed thereby actuating the solenoid 40 and removing the stop member or trigger releasing the piston 36, under force of the spring 38 causing the piston 36 to move in the direction of the end wall 32. The pressure thus produced acts through the fuel 11 and breaks or ruptures the disc 35 of the closure 34 to the end that the fuel 11 passes through the orifice 54 and conduit 14 into the catalyst chamber 15 where it reacts with the catalyst screens 16 to produce high pressure steam.

By virtue of the conduit 26, a portion of this steam is directed into the pressure chamber A where it acts upon the piston 36 to supplement the action of the spring 38. It is apparent, therefore, that the spring 38 need only have sufficient power to rupture the diaphragm portion 35 to initiate the flow fo fuel 11 to the catalyst chamber 15, since immediately upon the formation of steam in the catalyst chamber 15, a portion thereof is conducted to the pressure compartment A where it is utilized to move the piston 36 and force the fuel 11 through the system.

As previously set forth, the high pressure steam generated in the catalyst chamber 15 is directed through the nozzle 17 and serves to rotate the turbine 19, and the shaft 22 to which the turbine 19, alternator 20 and pump 21 are fixedly secured.

The effective area of the orifice 54 of the metering valve 13 is so designed and constructed that when the valve member 56 is in its fully retracted position, the quantity of fuel delivered to the chamber 15 will be in excess of that required to produce enough steam in the chamber 15 to bring the turbine 19 up to a desired rotation of speed. Therefore, the initial delivery of fuel 11 to the catalyst chamber 15 results in the generation of a relatively high pressure steam that effects a rapid start, and increase, in the rotational velocity of the turbine 19.

As the rotation of the turbine 19 approaches a value where the alternator 20 and pump 21 will supply the desired frequency and power output respectively, the governor 23 actuates the valve member 85 in a direction to partially open the orifice 84 of the pilot valve 24. High pressure steam is therefore, permitted to pass through the orifice 84, chamber 83 and conduit 92 into the metering valve 13, where it acts upon the piston 57 to move the valve member 56, against the bias of spring 61, to partially close the orifice 54. The quantity of fuel 11 being delivered to the chamber 15 is therefore diminished and as a result, the pressure of the steam in catalyst chamber 15, and concurrently the velocity of the steam jet issuing from the nozzle 17, is also reduced. Thus, through the aforementioned adjustment of the effective area of the orifice 54 of the metering valve 13, the fuel system is brought into a balanced, or stabilized condition, where the quantity of fuel 11 delivered to the chamber 15 is sufficient to generate the quantity of steam required to maintain a desired rotational velocity of the turbine 19.

If for some reason, the rotational velocity of the turbine 19 decreases, the governor 23 will actuate the pilot valve 24 in such a manner as to move the valve member 85 closer to the orifice 84. The steam pressure acting on the piston 57 will therefore be reduced, and the spring 61 will move the valve member 56 in a direction to increase the effective area of the orifice 54, thus increasing the delivery of the hydrogen peroxide fuel 11 to the chamber 15. The resulting increase of steam pressure in the chamber 15 will produce a higher velocity steam jet that will once more bring the turbine 19 up to the desired rotational speed.

On the other hand, should the speed of the turbine 19 increase above the desired value, the governor 23 will actuate the pilot valve 24 to provide a steam pressure in the metering valve 13 that will be effective to reduce the effective area of the orifice 54. Thus, the quantity of hydrogen peroxide fuel 11 being delivered to the chamber 15 will be reduced and the speed of the turbine 19 reduced, as hereinbefore set forth.

In short, through the governor 23 and pilot valve 24, the orifice of the metering valve 13 is adjusted to maintain a substantially constant rotational velocity of the turbine 19 and thus a substantially constant frequency and power output of the alternator 20 and pump 21 is achieved.

From the foregoing it will be evident that there is thus provided a novel self-contained power plant embodying means for utilizing hydrogen peroxide for a fuel, and capable of producing a substantially constant frequency output from an alternator and source of hydraulic power from a pump. Thus, the objects and purposes of the instant invention hereinbefore set forth have been achieved.

Although but one embodiment of the instant invention has been illustrated and described, changes and modifications in the form, and relative arrangement of parts which will be apparent to those skilled in the art, may be made without departing from the spirit and scope of the invention.

What is claimed is:

1. For use in a powder plant of the type employing hydrogen peroxide as a fuel the combination comprising a catalyst chamber for converting said fuel into steam, a turbine fixedly mounted on a rotatable shaft, nozzle means for directing said steam to drive the turbine, means for delivering fuel to said chamber and controlling the delivery thereof in response to the rotational velocity of said turbine, comprising a fuel container, a piston slidably mounted in said container and defining therein pressure and fuel compartments, a supply conduit connecting said fuel compartment to said chamber, frangible means closing communication between said fuel compartment and said supply conduit, a spring positioned in said pressure compartment to bias said piston, stop means operative to hold said piston in a fixed position within said container against the biasing force of said spring, means for releasing said stop means whereupon said spring biases said piston in a direction to cause rupture of said frangible means and force fuel from said compartment into and through said supply conduit to said chamber, a pressure conduit connecting said chamber to said pressure compartment whereby steam developed in the chamber is delivered to said pressure compartment to supplement the biasing force of the spring upon said piston, a metering valve in said supply conduit for controlling flow therethrough, said valve comprising a housing, an orifice in said housing, a valve member adapted to control the effective area of said orifice and having a piston slidably mounted in said housing, and a spring normally biasing said valve member in a direction to fully open said orifice, a second pressure conduit for connecting said chamber to said valve housing whereby said valve member is actuated by steam developed in said chamber against the biasing force of said spring to close said orifice, a control valve in said second pressure conduit for controlling the delivery of steam from said chamber to said metering valve, and a speed governor connected between said control valve and the shaft of said turbine whereby the operation of said second valve in response to the rotational velocity of said shaft operates said metering valve to control flow through said supply conduit so as to maintain said turbine at a substantially constant rotational velocity.

2. For use in a power plant of the type employing hydrogen peroxide as a fuel and including a catalyst chamber for converting said fuel into steam, the combination of means for controllably delivering fuel to said chamber, comprising a fuel container, a piston slidably mounted in said container and defining therein pressure and fuel compartments, an outlet for said fuel compartment, a frangible member closing said outlet, a metering valve including a housing having an inlet connected to the outlet of said fuel compartment and adapted to receive fuel therefrom, a supply conduit connected between said valve housing and the catalyst chamber, an orifice in said valve housing interposed between the inlet thereof and said supply conduit, a valve member including a valve head adapted to coact with said orifice and a piston portion slidably mounted in said housing, a spring engaging one side of said piston portion and biasing said valve member in one direction, and pressure conduit means between said valve housing and the catalyst chamber whereby a portion of the steam formed in the catalyst chamber is delivered to the side of the piston portion of said valve member opposite to that engaged by said spring to thereby move said valve member against the bias of said spring and position said valve head relative to said orifice to thereby control the flow of fuel to the catalyst chamber.

3. In a power plant including a turbine fixedly mounted on a shaft for rotation therewith, the combination of means for rotating said turbine, comprising a fuel container, a piston slidably and sealingly mounted in said container and defining therein a fuel compartment and a pressure compartment, a catalyst chamber for converting fuel from said compartment into steam, a first conduit connecting said fuel compartment to said chamber, spring means in said pressure compartment and operative on said piston to force fuel from said fuel compartment through said first conduit into said chamber, means for conducting steam generated in said chamber to said turbine for the rotation thereof, a second conduit connecting said chamber to said pressure compartment whereby steam generated in said chamber is conducted to said pressure compartment to augment the operation of said spring, first valve means for controlling the flow of fuel through said first conduit, a third conduit between said chamber and said first value means to conduct steam from said chamber to said first valve means and whereby said first valve means is operated in response to steam generated in said chamber, second valve means controlling the flow of steam through said third conduit, and governor means operatively connecting said second valve means to the shaft of said turbine and responsive to the rotational velocity thereof whereby the operation of said second valve is controlled by the rotational velocity of said turbine to control the flow of steam through said third conduit and thereby control the operation of said first valve means.

References Cited in the file of this patent

UNITED STATES PATENTS

| 515,500 | Nobel | Feb. 27, 1894 |
| 1,052,588 | Janicki | Feb. 11, 1913 |
| 1,504,144 | Romberg | Aug. 5, 1924 |
| 1,588,885 | Hart | June 15, 1926 |
| 2,336,052 | Anderson et al. | Dec. 7, 1943 |
| 2,402,826 | Lubbock | June 25, 1946 |
| 2,487,053 | Hickman | Nov. 8, 1949 |
| 2,523,009 | Goddard | Sept. 19, 1950 |
| 2,548,268 | Metsger | Apr. 10, 1951 |
| 2,573,724 | Neal | Nov. 6, 1951 |
| 2,590,853 | Fulton | Apr. 1, 1952 |
| 2,605,609 | Bush | Aug. 5, 1952 |
| 2,631,426 | Jewett | Mar. 17, 1953 |

OTHER REFERENCES

"Liquid Propellant Rocket Power Plants," by M. J. Zucrow, appearing in "Journal of the American Rocket Society," No. 72, December 1947, pp. 26–44 (pp. 26–30 pertinent).

UNITED STATES PATENT OFFICE

CERTIFICATE OF CORRECTION

Patent No. 2,926,492                                      March 1, 1960

Robert M. Flanagan

It is hereby certified that error appears in the printed specification of the above numbered patent requiring correction and that the said Letters Patent should read as corrected below.

Column 3, line 38, for "steam" read -- stem --; column 4, line 5, for "flow fo" read -- flow of --; column 5, line 14, for "fuel the" read -- fuel; the --; column 6, line 33, for "value" read -- valve --.

Signed and sealed this 16th day of August 1960.

(SEAL)
Attest:

KARL H. AXLINE
Attesting Officer

ROBERT C. WATSON
Commissioner of Patents